Dec. 7, 1971    T. L. SCHUETTE ET AL    3,624,890
MACHINE FOR AUTOMATICALLY ASSEMBLING ARMATURE
CORES AND COMMUTATORS THEREFOR
Original Filed Feb. 20, 1969    17 Sheets-Sheet 1

Inventors
Thomas L. Schuette
Melvin J. Straub
Pierre Dumas
Peter F. Aurich
By
Attorney

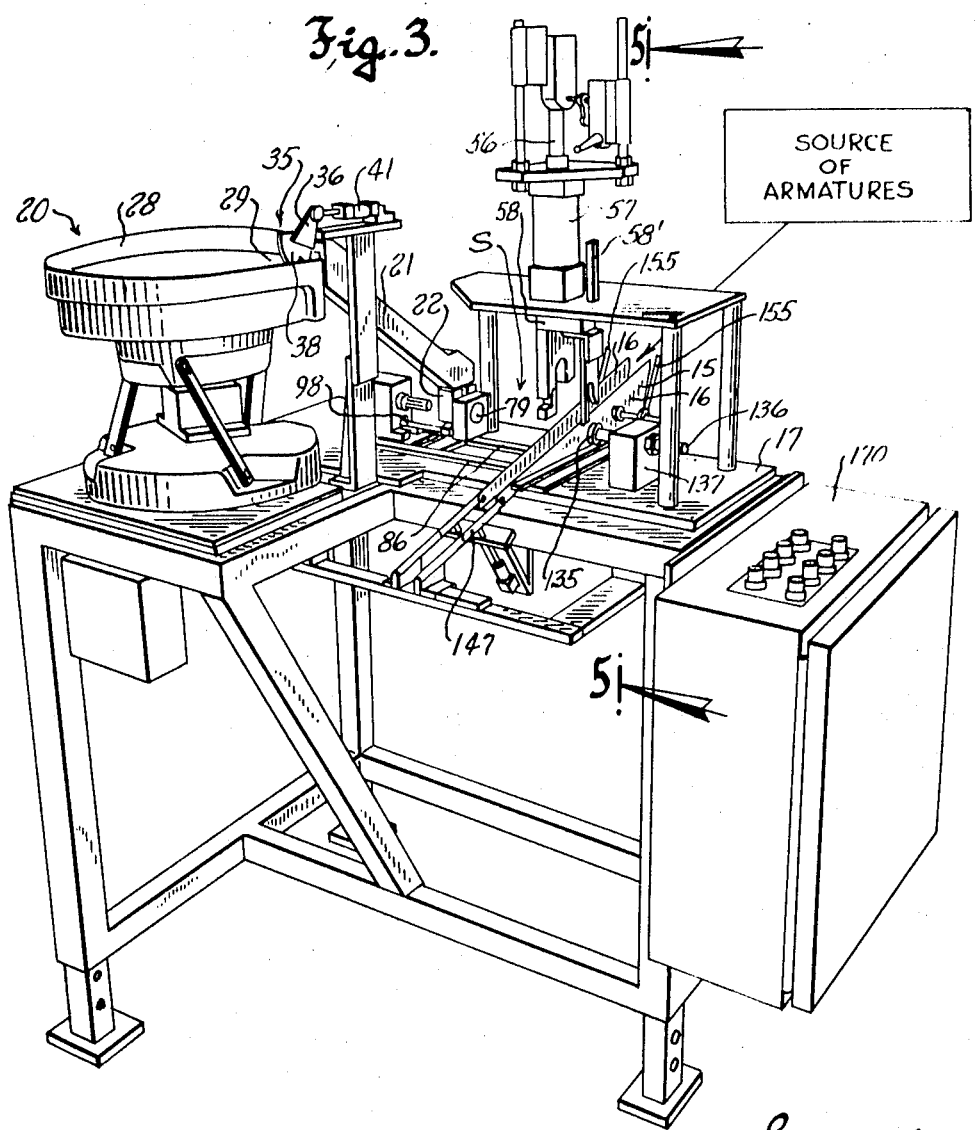

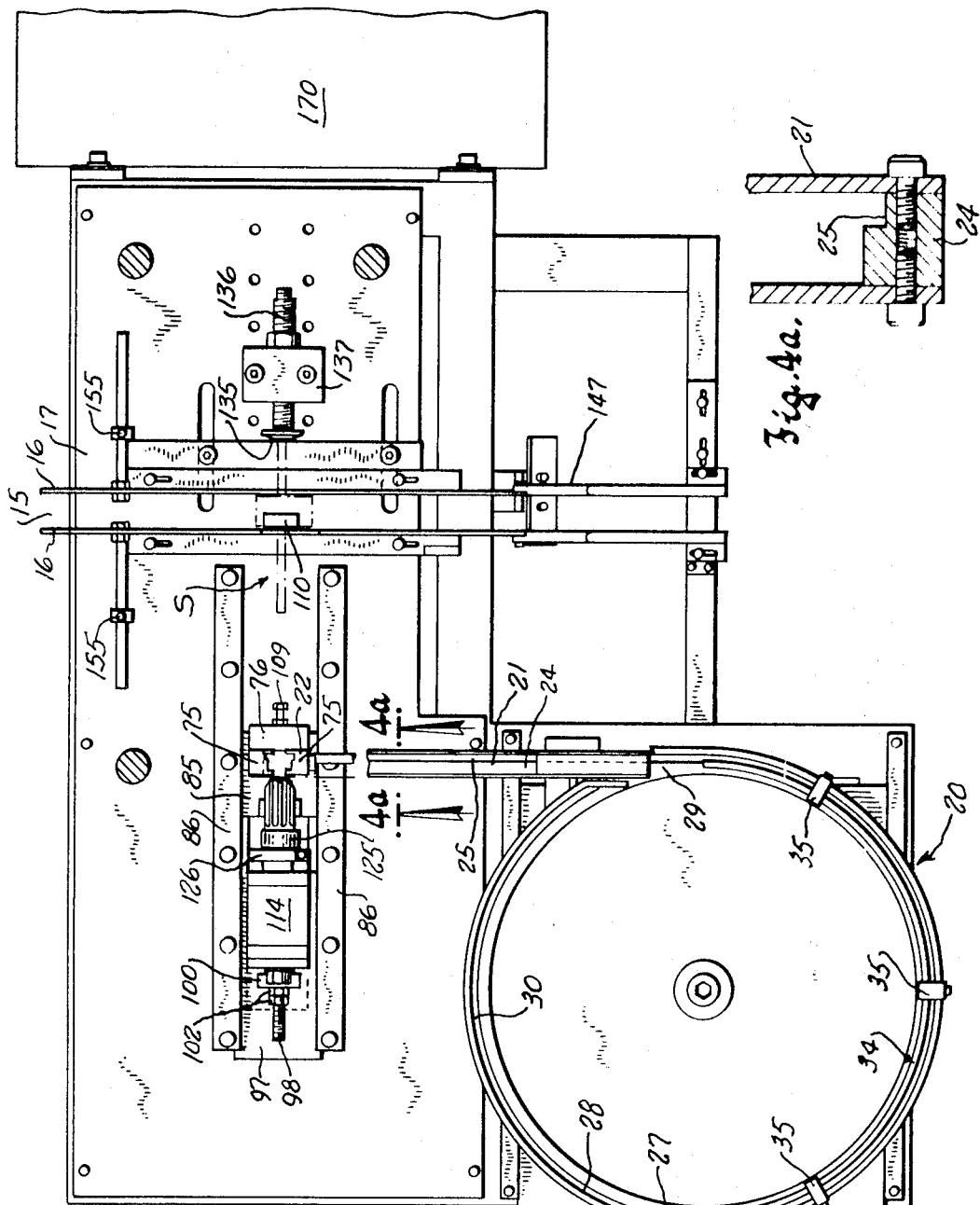

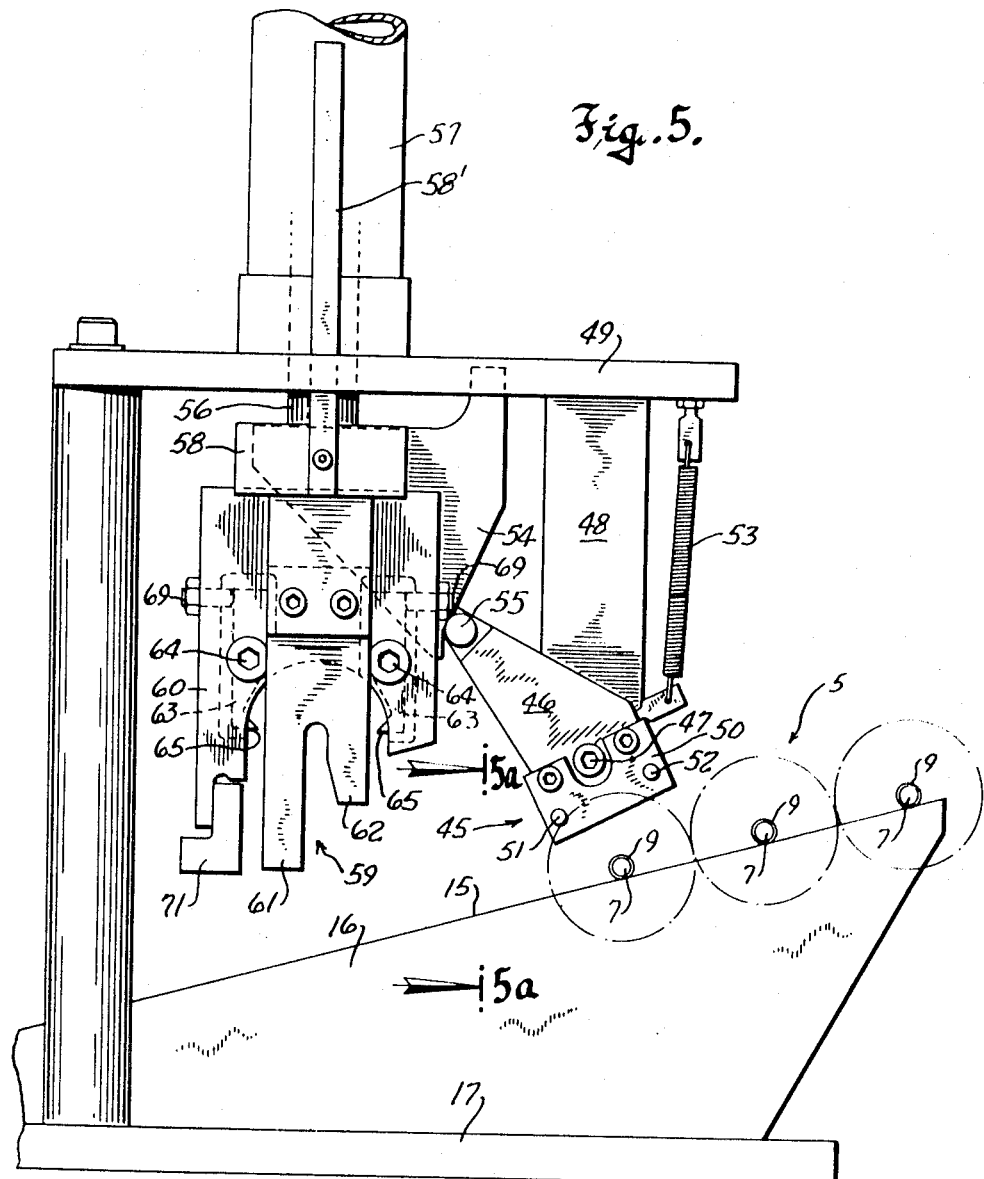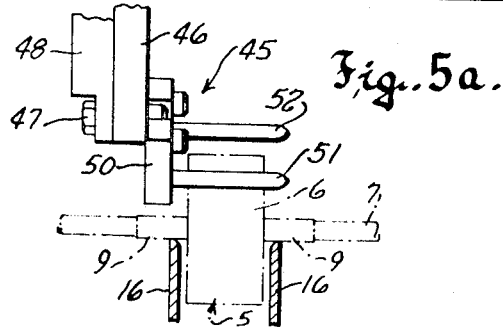

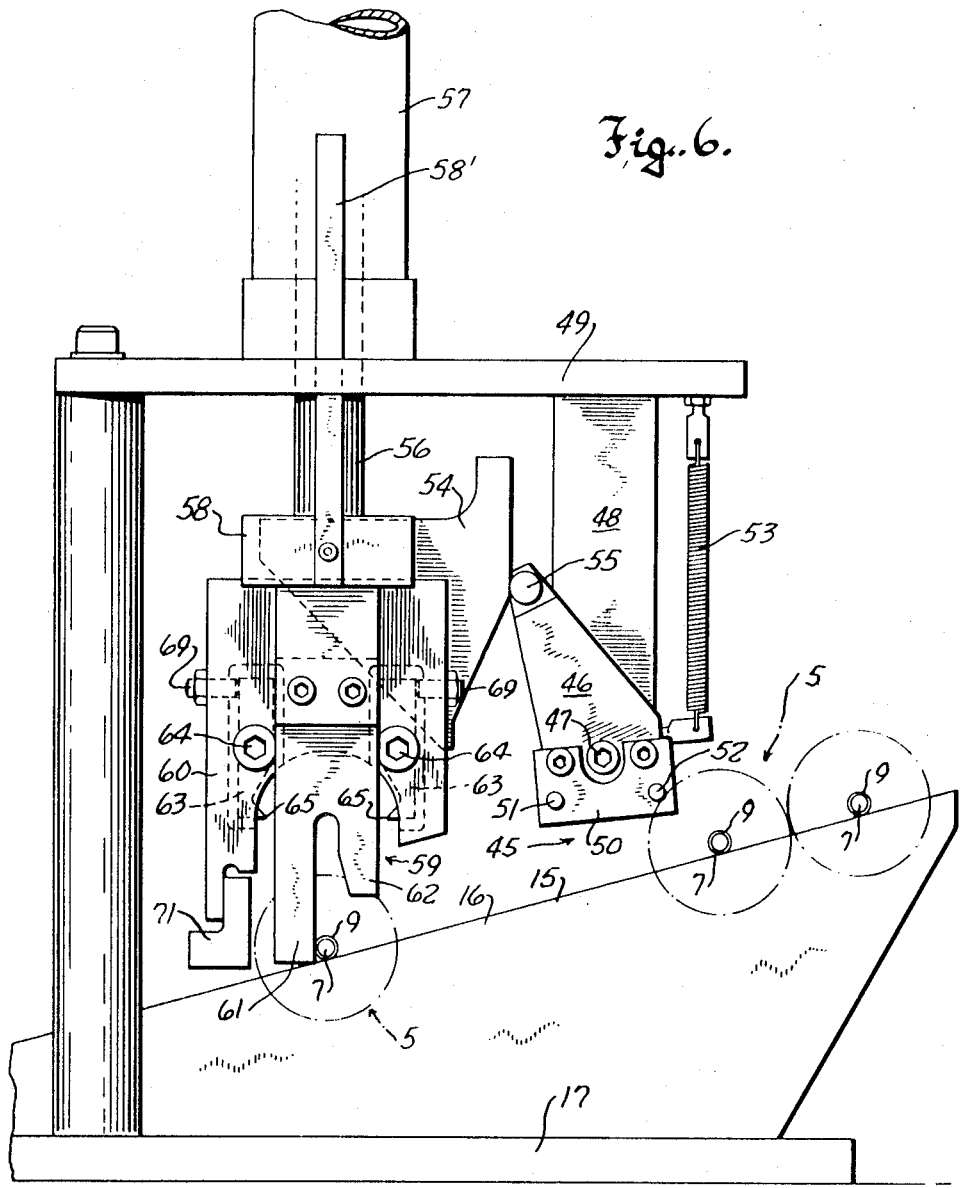

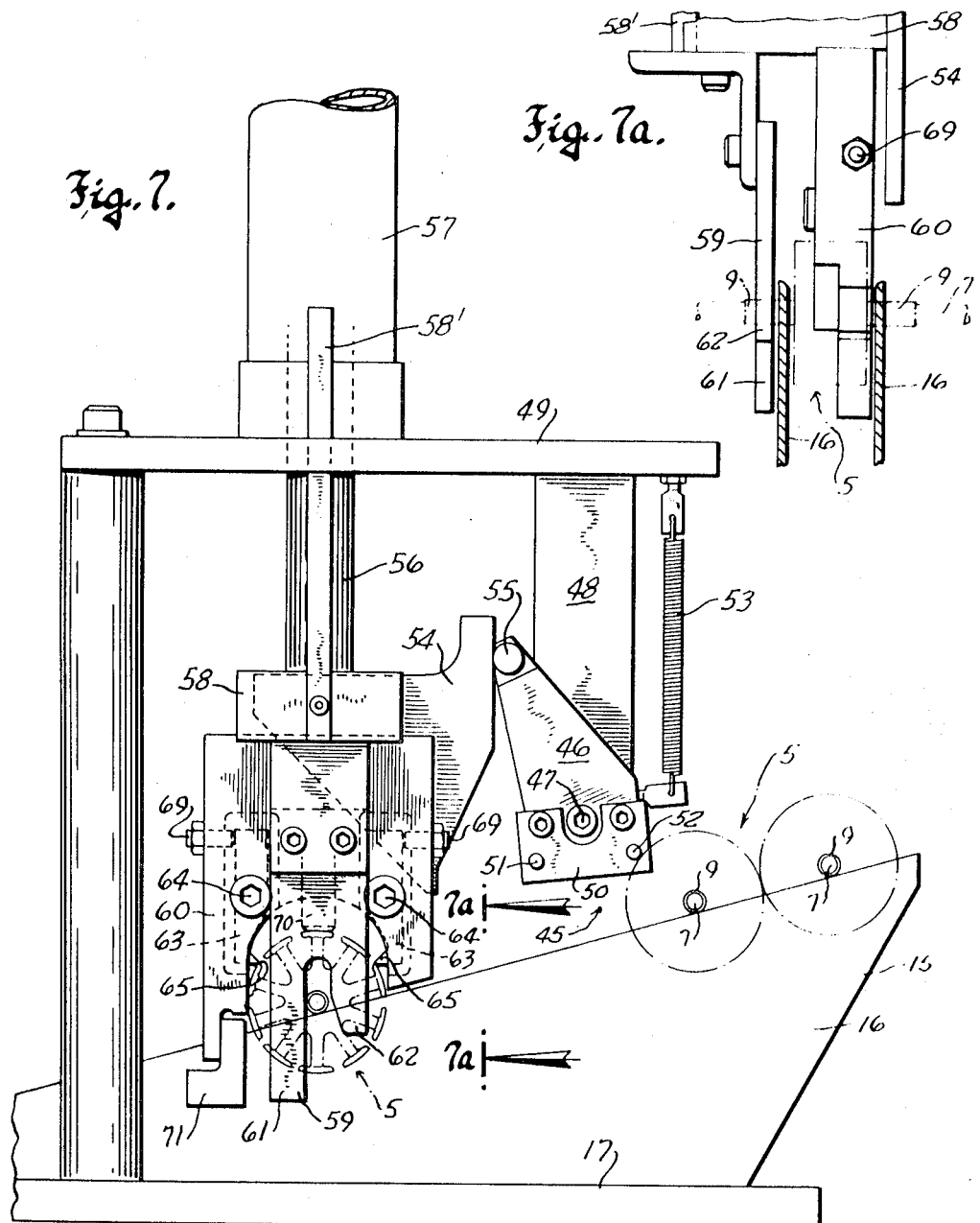

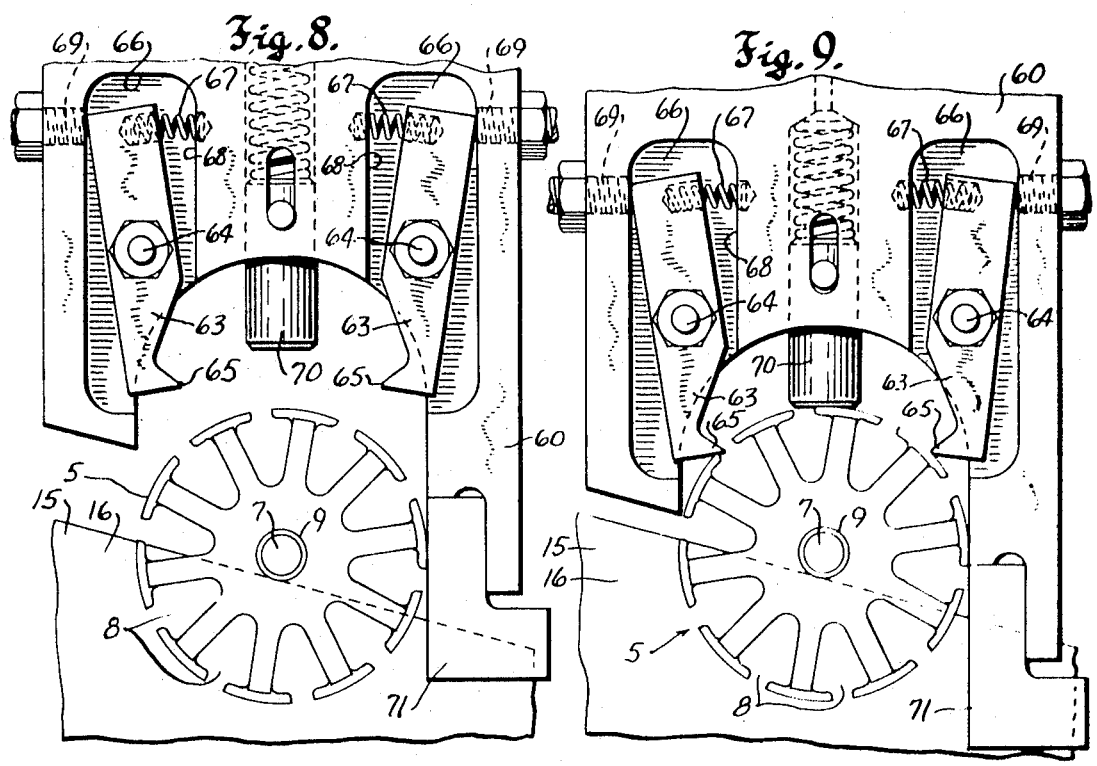
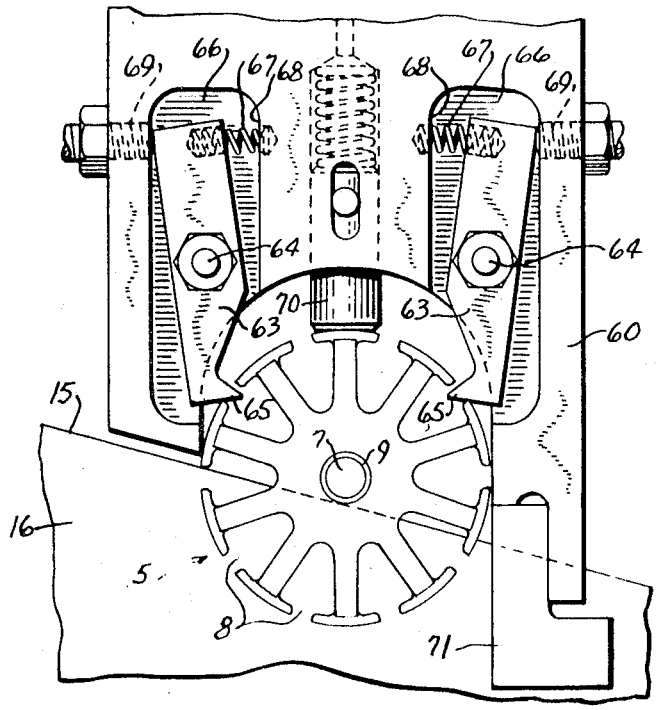

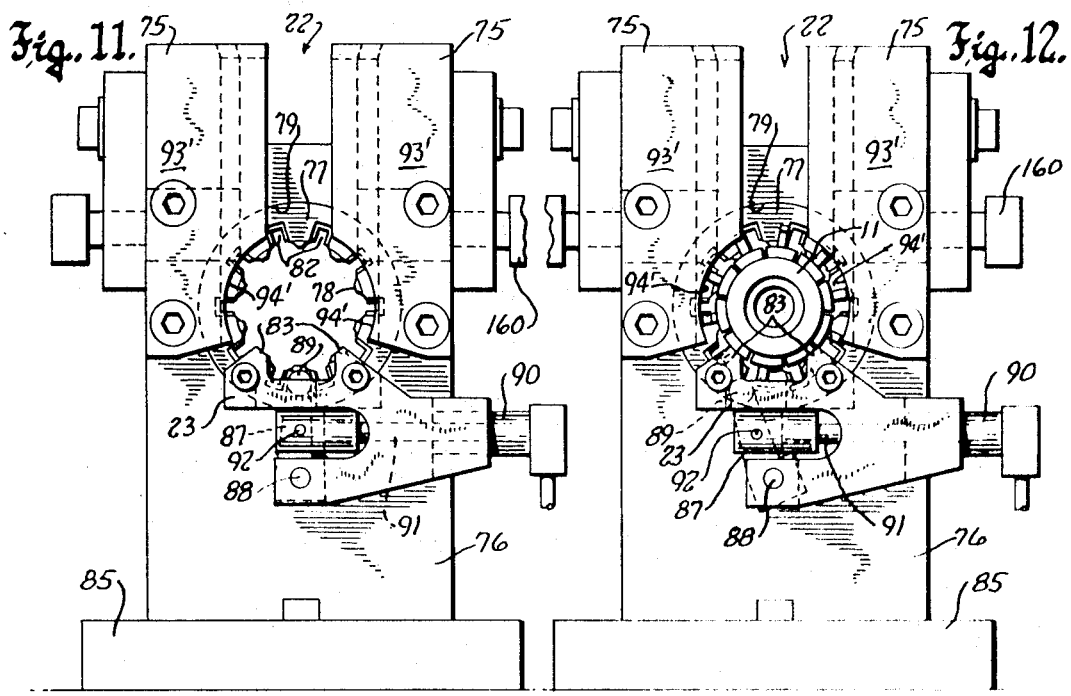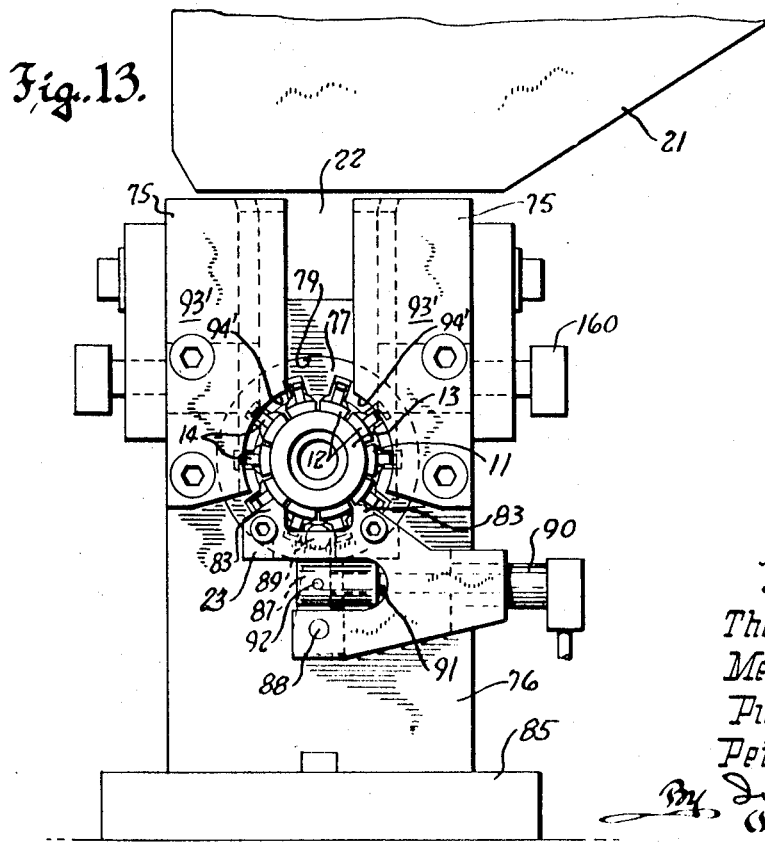

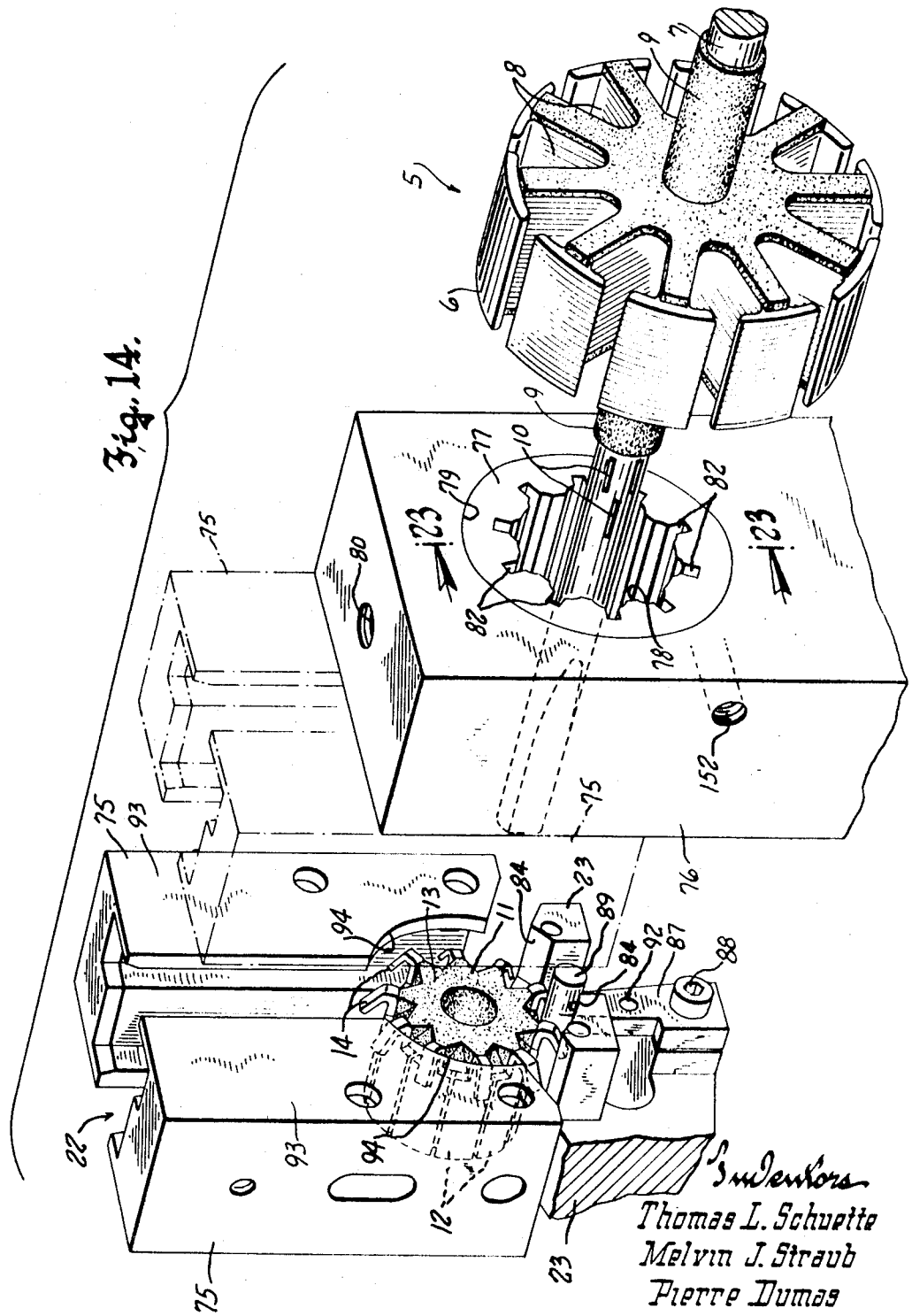

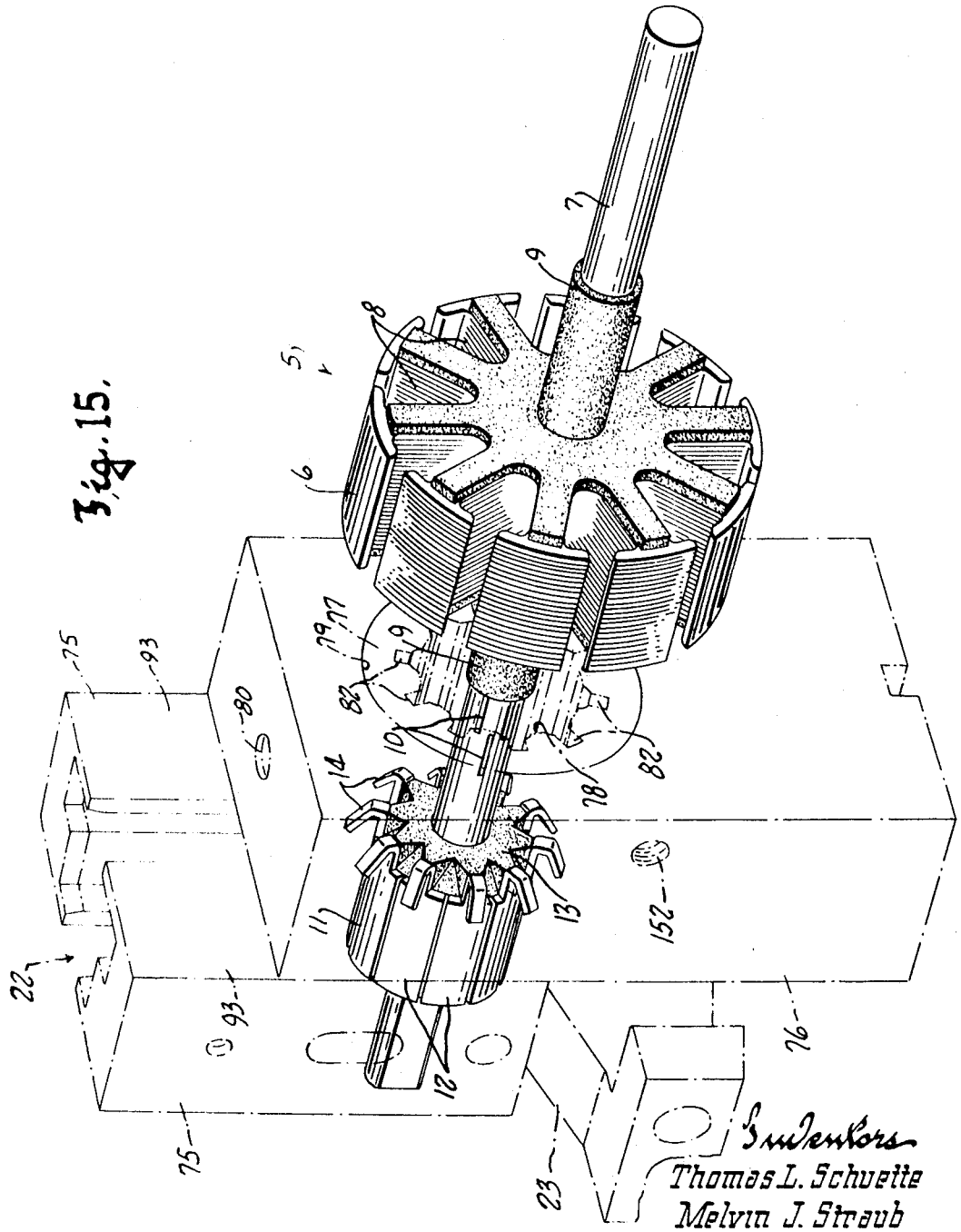

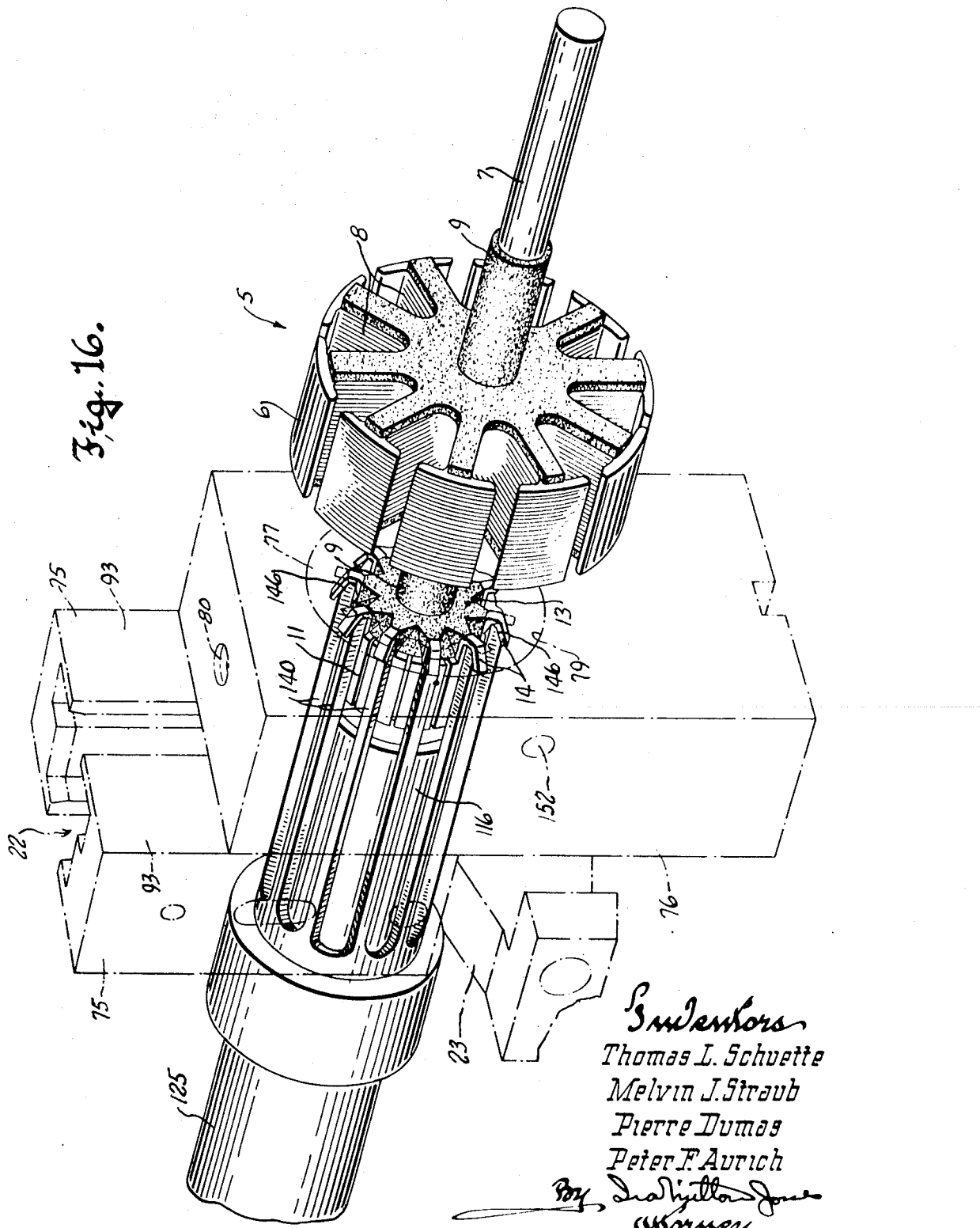

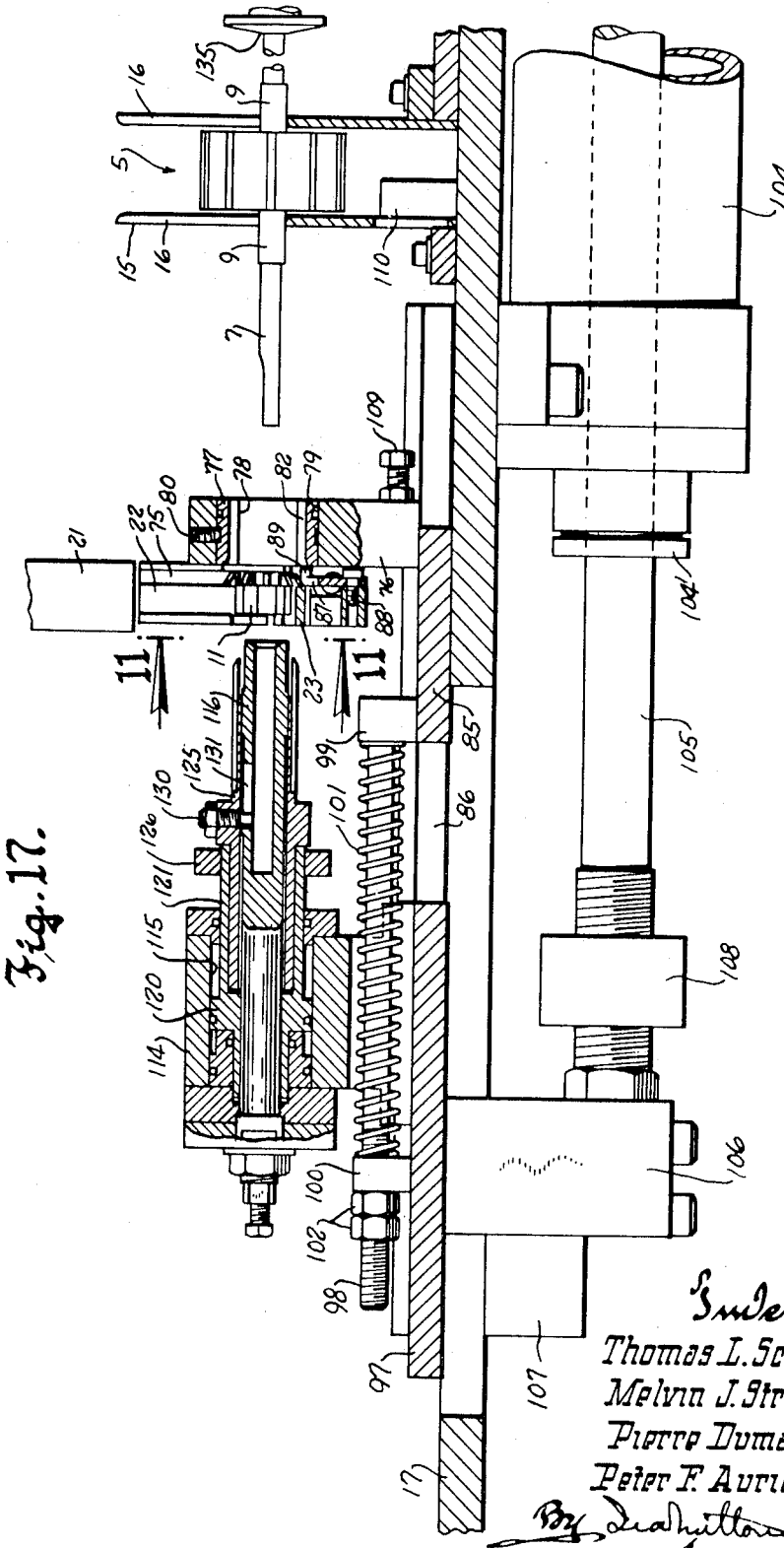

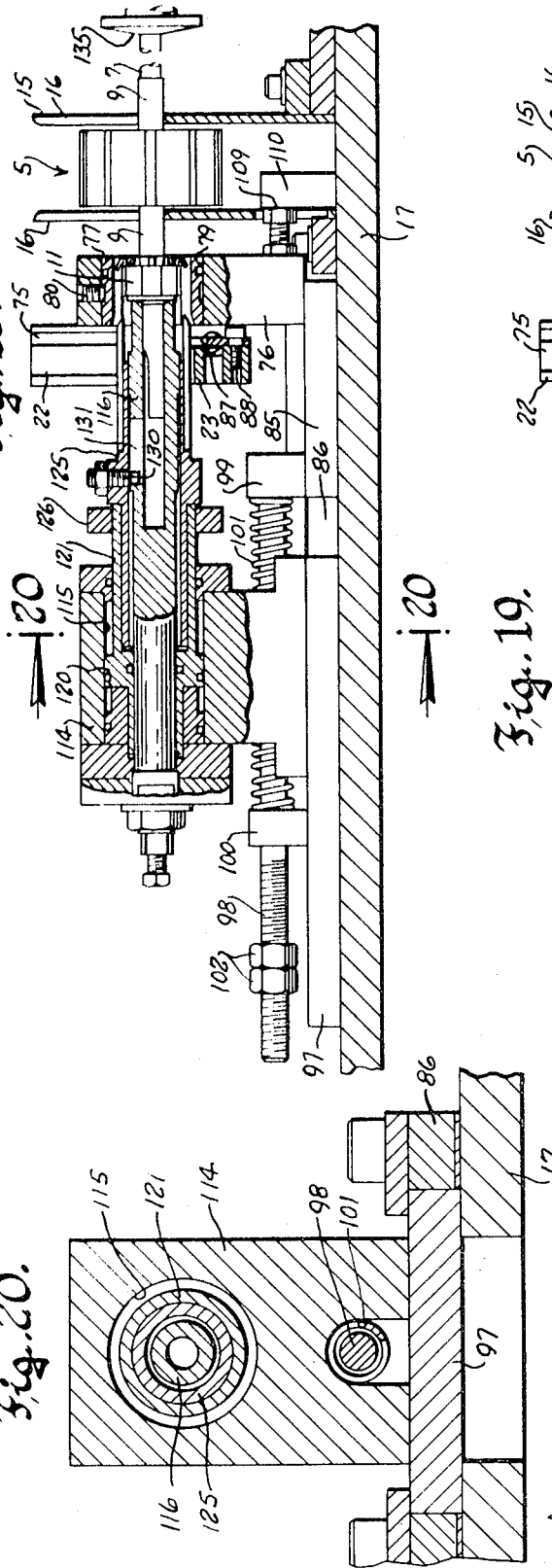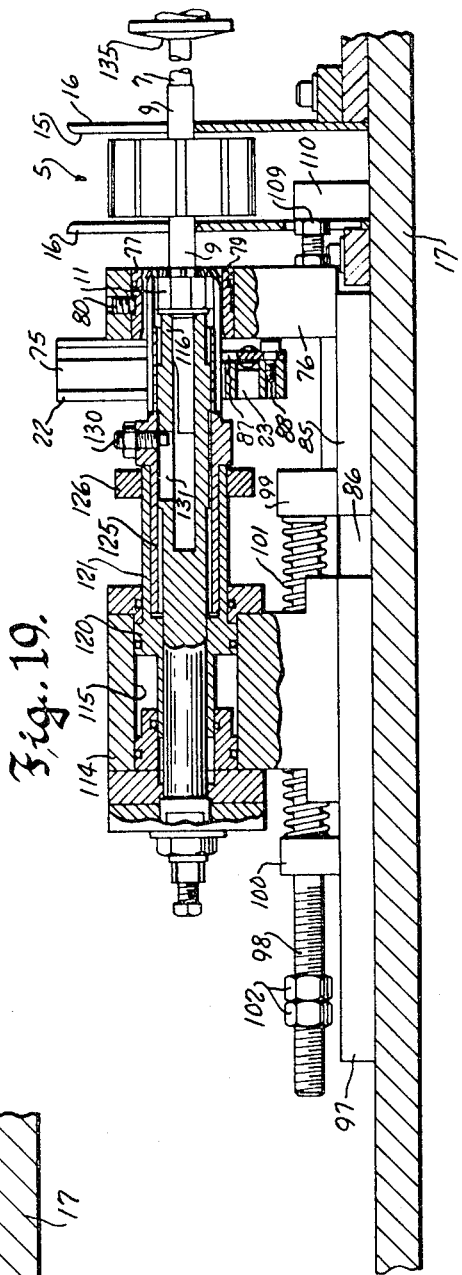

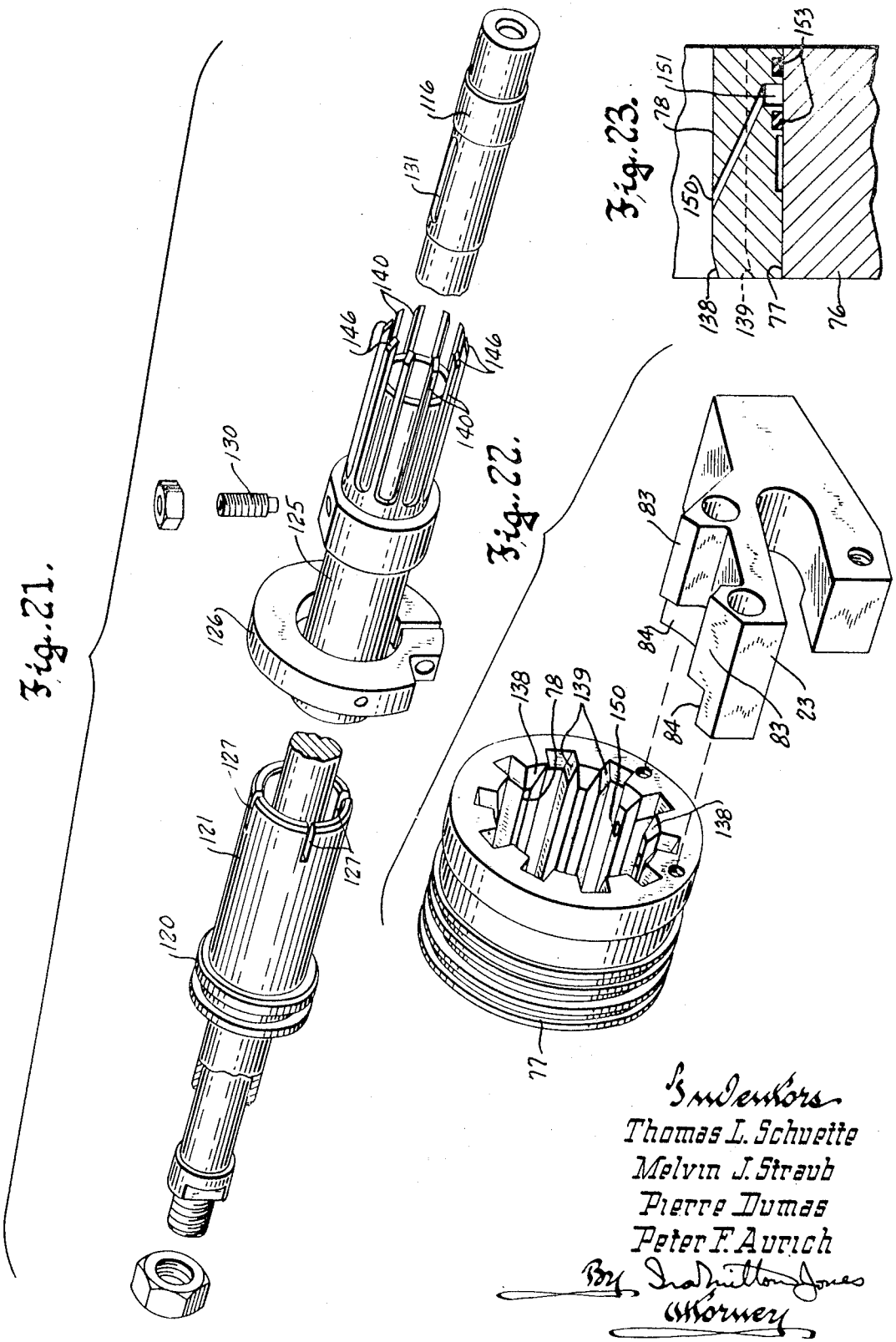

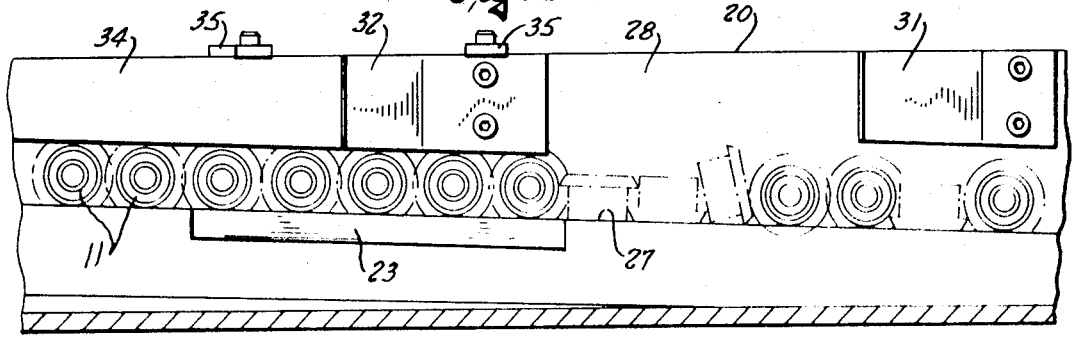
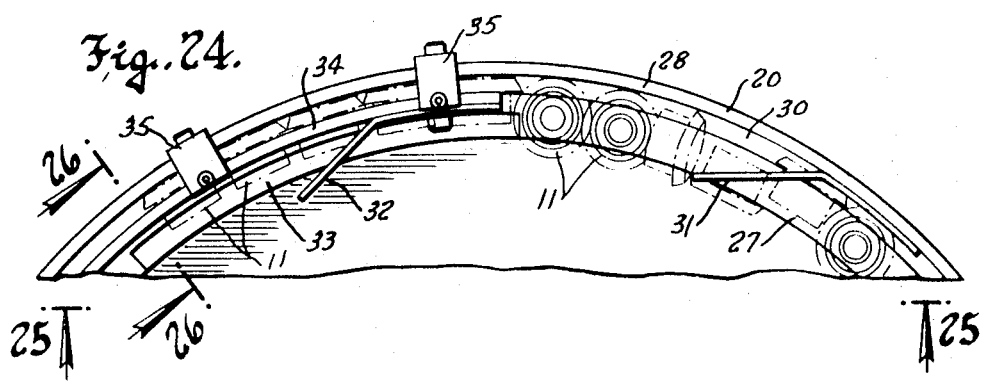
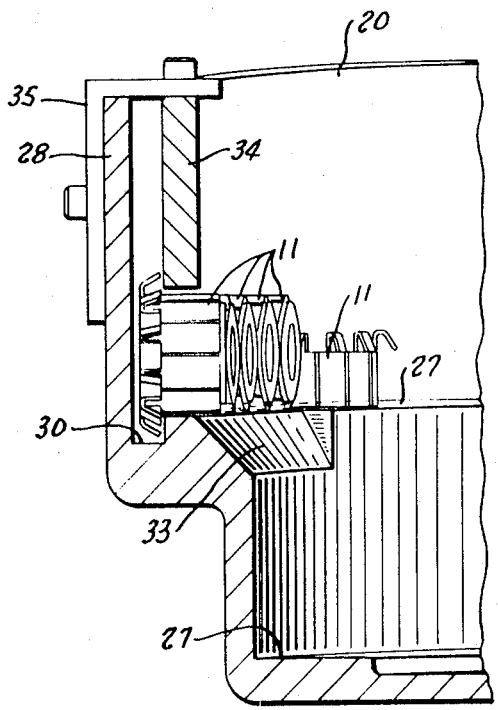
Inventors
Thomas L. Schuette
Melvin J. Straub
Pierre Dumas
Peter F. Aurich Inventors
Thomas L. Schuette
Melvin J. Straub
Pierre Dumas
Peter F. Aurich

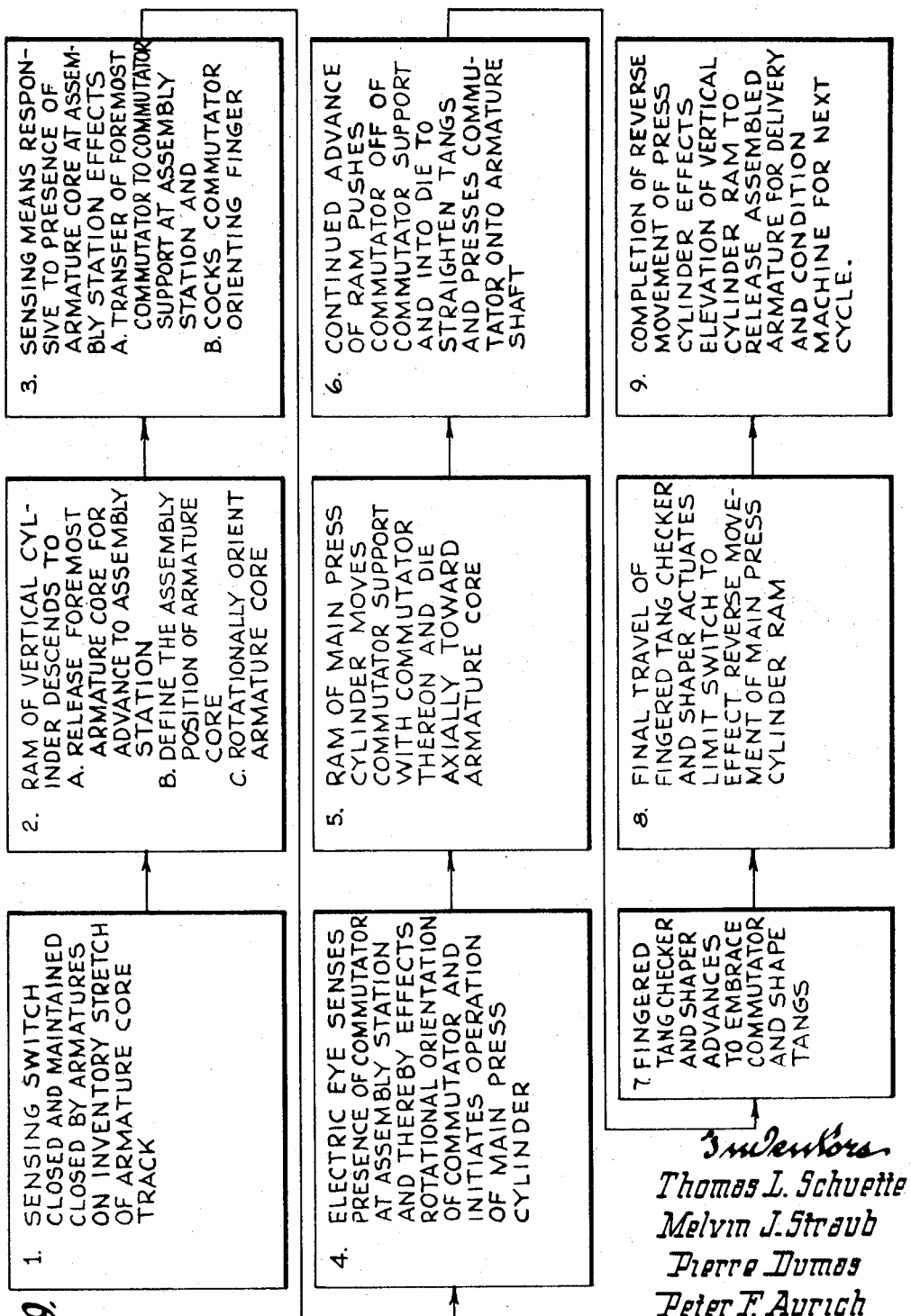

United States Patent Office 3,624,890
Patented Dec. 7, 1971

3,624,890
MACHINE FOR AUTOMATICALLY ASSEMBLING ARMATURE CORES AND COMMUTATORS THEREFOR
Thomas L. Schuette, Osseo, Melvin J. Straub, Minnetonka, and Pierre Dumas and Peter F. Aurich, Minneapolis, Minn., assignors to Possis Machine Corporation, Minneapolis, Minn.
Original application Feb. 20, 1969, Ser. No. 801,084, now Patent No. 3,579,771, dated May 25, 1971. Divided and this application Sept. 16, 1970, Ser. No. 72,576
Int. Cl. H02k 15/00; H01r 43/06
U.S. Cl. 29—205 CM
13 Claims

ABSTRACT OF THE DISCLOSURE

Feeding mechanism successively brings armature cores and commutators therefor to an assembly station where they are held in coaxial endwise spaced relationship and where rotation imparting mechanism brings each armature core and commutator pair into correct angular relationship. A ram then pushes the commutator axially towards the armature core with the terminal tangs on the commutator facing the core, and presses it onto the shaft thereof, moving the commutator through a die which straightens tangs that may be askew. The tang straightening die has a round hole that slidably accepts the commutator, and longitudinally extending circumferentially spaced parallel grooves that slideably accommodate the tangs. When the commutator reaches proper position on the armature shaft, and while still in the die, a tang shaping member having circumferentially spaced parallel fingers, one for each tang, telescopes over the commutator, each finger moving along one of the grooves to engage under the tang therein and lift it into contact with the bottom of the groove.

---

This invention as that of the copending application Ser. No. 801,084, filed Feb. 20, 1969, now Pat. No. 3,579,771, of which this application is a division, relates broadly to machines for assembling parts of electric motors, and refers more particularly to a machine for assembling commutators which have circumferentially spaced terminal tangs at one end thereof, onto armature cores of the type comprising a stack of laminations with circumferentially spaced winding receiving slots, solidly mounted upon a shaft. When properly assembled, the commutator and armature core are so oriented that the terminal tangs of the commutator are in predetermined relationship with respect to the winding slots of the armature core, both angularly and axially. This relationship may be such that for each winding slot there is a single terminal tang in line therewith, as in the assembly specifically illustrated herein; or there may be two or even more terminal tangs for each slot, depending upon the nature of the windings to be applied to the core. Also, the tangs are not necessarily in line with the winding slots, even where there is only one tang per slot.

The purpose and object of this invention is to provide a machine for automatically assembling commutators and armature core more efficiently, more reliably, and faster than heretofore possible, regardless of the numerical relationship between the winding slots of the armature core and the terminal tangs on the commutator.

It has been customary to press-fit the commutators onto the shaft of the armature. In the past (as shown for instance by Pat. No. 1,690,322) this was done manually by placing each armature core and its commutator in an arbor press, in the correct angular orientation to one another, and then, by actuation of the arbor press, forcing the commutator onto the shaft of the armature. Needless to say, production rates by this method were quite limited.

Although there have been efforts prior to this invention to automate the assembly of armature cores and their commutators, all known earlier machines for this purpose left much to be desired. One of the principal objections to the known prior machines was their inability to satisfactorily cope with commutators on which the terminal tangs are bent askew or otherwise improperly disposed. As a result, many of the assembled units were defective and had to be rejected. By contrast, the machine of this invention has reduced the rate of rejects by ninety percent (90%) and has done so despite its unprecedented production rates of six hundred to seven hundred assemblies per hour. To illustrate, in the past it was not unusual that as many as fifty out of one thousand armatures would have to be rejected because of defective terminal tangs. This constituted a five percent (5%) reject rate. The ninety percent (90%) reject rate reduction brought about by the machine of this invention, has reduced rejects to no more than five per one-thousand armatures.

To a large degree, the very high production rates made possible by the machine of this invention result from the fact that the straightening and shaping of the terminal tangs of the commutator takes place while the commutator and armature core are being assembled—in other words, all operations upon both the commutator and the armature core are performed at one station in the machine.

To accomplish this objective, the machine of this invention has means for continuously and successively transferring armature cores and commutators from sources thereof to an assembly station in the machine where the commutators and armature cores are paired and, when thus paired, are rotated relative to one another to bring them into proper angular orientation with the terminal tangs of the commutator aligned with or otherwise properly disposed with respect to the winding slots of the armature core. This takes but a fraction of a second. The commutator core is then moved axially toward the armature core and pressed onto its shaft, and during this assembling operation the terminal tangs of the commutator are straightened and formed into hooks of uniform shape.

In the event one or more of the terminal tangs of the commutator have been deformed to the extent that they cannot be straightened and properly shaped, sensing mechanism which utilizes the tang-shaping means, initiates the functioning of a reject mechanism so that when the assembled armature core and commutator with the defective terminal tang or tangs leave the assembling station of the machine, it is shunted into a reject path, as distinguished from the path traveled by assemblies that are proper in all respects, and which may lead to other machines where additional operations are performed.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate one complete example of the physical embodiment of the invention constructed according to the best mode so far devised for the practical application of the principles thereof, and in which:

FIG. 3 is an overall perspective view of the machine;

FIG. 4 is essentially a top plan view of the entire machine, some of its upper structure having been omitted for sake of clarity;

FIG. 4a is a detail sectional view through FIG. 4 on the plane of the line 4a—4a;

FIGS. 5, 6 and 7 are elevational views generally taken on the plane of the line 5—5 in FIG. 3, illustrating the mechanism by which the armature cores are successively and individually presented to the assembly station of the machine, the mechanism being shown in different positions in the succeeding views;

FIG. 5a is a detail sectional view through FIG. 5 on the plane of the line 5a—5a;

FIG. 7a is a detail sectional view through FIG. 7 on the plane of the line 7a—7a;

FIGS. 8, 9 and 10 are detail views illustrating that part of the mechanism shown in FIGS. 5, 6 and 7, by which an armature core at the assembly station is rotated to a position in which its winding slots are in a predetermined orientation with respect to a fixed vertical plane passing through the axis of the core;

Figure 1:
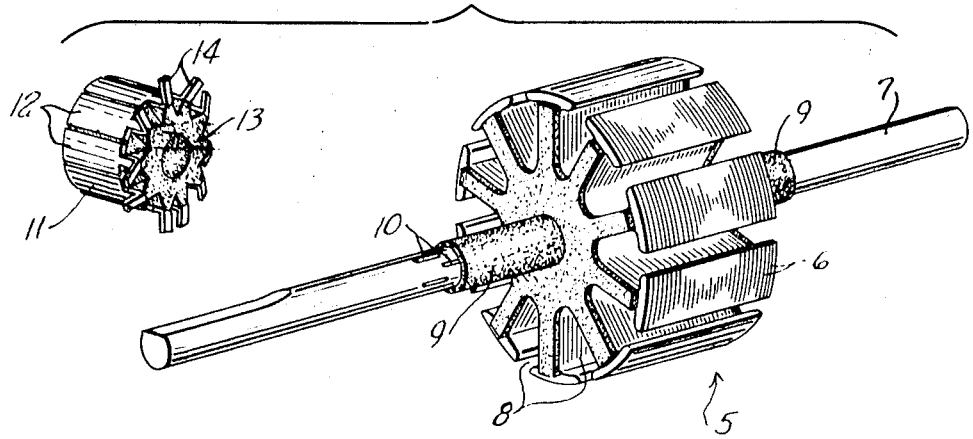
FIG. 1 is a perspective view of an armature core and commutator of the type the machine of this invention is designed to assemble into the rotor unit shown in FIG. 2.
Figure 27:
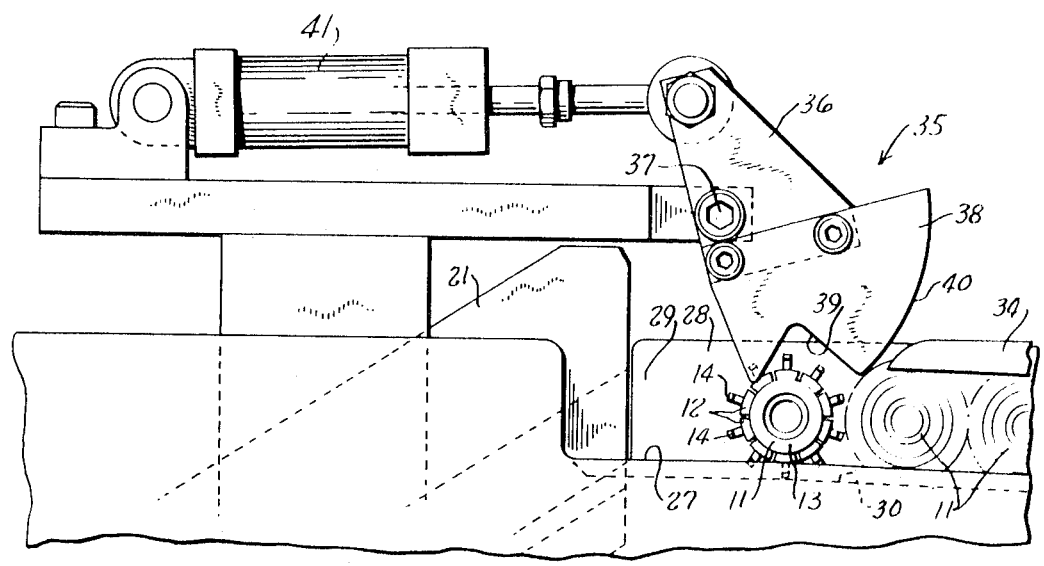
Figure 28:
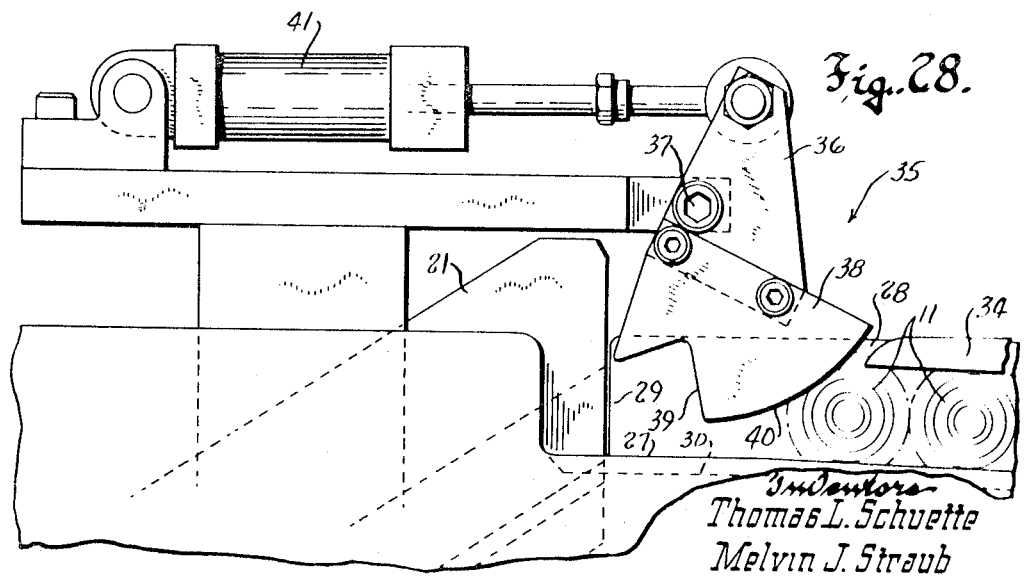

FIGS. 11, 12 and 13 are vertical elevational views generally taken on the plane of the line 11—11 in FIG. 17, illustrating the mechanism by which a commutator is held at the assembly station in coaxial alignment with an armature core thereat, and by which the commutator is positively rotated into correct angular orientation with respect to the armature core, preparatory to being assembled therewith, said views illustrating the commutator rotating mechanism in different positions;

FIG. 14 is a perspective view of the commutator holding and rotating mechanism shown in FIGS. 11–13, inclusive, and the die by which the tangs on the commutator are straightened as the commutator is press fitted onto the shaft of the armature core, the die being shown displaced from its correct position for sake of clarity, and an armature core being illustrated in position to receive a commutator;

FIG. 15 is a perspective view of an armature core and commutator in the act of being assembled, and in broken lines illustrating the commutator holding structure and the tang straightening die;

FIG. 16 is a perspective view of the assembled armature core and commutator and illustrating the mechanism by which the tangs are shaped;

FIG. 17 is a sectional detail view through the mechanism at the assembly station of the machine, said view illustrating an armature core and its commutator in coaxial, axially spaced relation preparatory to being assembled;

FIG. 18 is a view similar to FIG. 17, illustrating most of the structure shown therein, but with the parts thereof in the positions they occupy directly after the commutator has been pressed onto the shaft of the armature core and before the tang shaping mechanism has functioned;

FIG. 19 is a view similar to FIG. 18, but showing the parts in the positions they occupy when the tang shaping mechanism has functioned;

FIG. 20 is a detail cross sectional view through FIG. 18 on the plane of the line 20—20;

FIG. 21 is an exploded perspective view of part of the mechanism by which the commutator is pushed onto the shaft of the armature core, and part of the mechanism by which the tangs of the commutator are shaped;

FIG. 22 is a perspective view of the tang straightening die and the basket-like support or holder in which the commutator sets while it is rotationally adjusted in preparation to being pushed onto the shaft of the armature core, attention being directed to the fact that in this FIG. 22 the parts illustrated are viewed from the direction opposite that of FIGS. 14, 15 and 16;

FIG. 23 is a fragmentary detail sectional view through FIG. 14 on the plane of the line 23—23;

FIG. 24 is a top plan view of a portion of the hopper or bowl in which a supply of the commutator is maintained for transfer to the assembly station of the machine;

FIG. 25 is a vertical sectional view through the commutator supply hopper, taken generally on the plane of the line 25—25 in FIG. 24;

FIG. 26 is a cross sectional view through the side wall of the commutator supply hopper, taken on the plane of the line 26—26 in FIG. 24;

FIGS. 27 and 28 are elevational views of the gate mechanism which controls transfer of the commutators from the supply hopper to the assembly station of the machine, showing the same in different positions; and FIG. 29 is a flow sheet depicting the successive operations which the machine performs.

Figure 2:
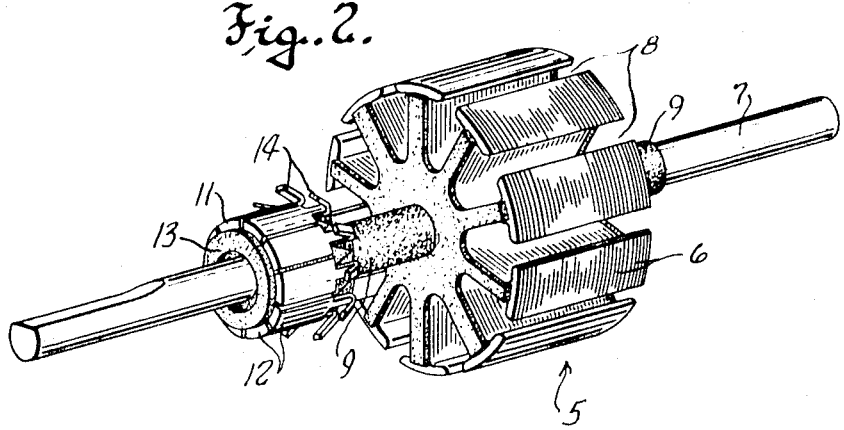

Referring now particularly to the accompanying drawings in which like parts are identified by like reference characters, in FIGS. 1 and 2 the numeral 5 designates generally an armature core of the type with which this invention is concerned, and which comprises a stack of laminations 6 firmly mounted upon a shaft 7. The stock of laminations has equi-circumferentially spaced winding receiving slots 8 opening to its peripheral boundry surface, and insulating sleeves 9 embrace the portions of the shaft 7 adjacent to the opposite sides of the stack. Beyond one of these sleeves the shaft has swedged ribs 10 projecting from its surface to bite into the bore of a commutator 11 when the same is press-fit ted onto the shaft.

The commutator 11, as is customary, comprises circumferentially spaced segments 12 solidly mounted upon a body of insulation 13 to collectively present a cylindrical surface upon which brushes ride when the armature is assembled in a dynamo electric machine. Each of the segments 12 has a hook-like terminal tang 14 at the end thereof facing the armature core, there being one segment 12 and one tang for each of the winding slots 8, in the specific armature structure shown. However, as noted hereinbefore, and as is well known to the art, there may be two or even more commutator segments and terminal tangs for each winding slot.

Since the winding of armatures is done on automatic machines, it is important that the terminal tangs be properly shaped and correctly positioned with respect to the winding slots 8 and the cylindrical surface of the commutator. This requirement for proper positioning and shaping of the terminal tangs presents a most difficult problem, and in prior attempts to automate the assembly of commutators and armature cores this problem either proved to be an insurmountable obstacle, or it unduly limited production rates. By contrast, the machine of this invention not only straightens and properly shapes the terminal tangs, but does so in a most reliable and expeditious manner while the commutators are being assembled onto the armature cores, so that the straightening and shaping of the tangs requires practically no additional time. This significant advantage is gained notwithstanding the fact that the commutators are very haphazardly handled, it being understood that the commutators, like the armature cores, are produced on other machines and must be transported to the assembling machine of this invention.

With reference now directed particularly to the general overall machine shown in FIGS. 3 and 4, the assembly station where the actual assembly of the armature core and its commutator takes place is identified by the reference character "S." The armature cores 5 reach this assembly station by rolling down a track 15 formed by two inclined rails 16 mounted upon a base 17 for adjustment toward and from one another to accommodate armature cores of different sizes. The base 17 constitutes part of the general frame structure of the machine.

The commutators 11 are dumped haphazardly into a vibratory bowl 20 from which they pass to a downwardly inclined track or chute 21 which leads to a vertical guideway 22 down which the commutators fall onto a basket-like support 23—FIGS. 11–14. The cross sectional shape of the inclined track or chute 21 is such that the commutators are free to roll therealong. Accordingly, the bottom 24 of the track or chute has a depression 25 adjacent to one side thereof to accommodate the tangs 14. The receiving and discharge end portions of the inclined track or chute 21 are preferably covered.

The vibratory bowl 20, which is essentially a conventional piece of apparatus, has an upwardly inclined track 27 formed in its side wall 28 onto and along which the commutators crawl due to the vibratory action of the bowl. As they travel along the track 27, improperly positioned commutators are knocked off the track and only correctly positioned commutators reach the discharge port 29 of the vibratory bowl, through which they pass onto the inclined track or chute 21.

As shown in FIG. 26, the track 27 has a groove 30 adjacent to the side wall 28, to accommodate the tangs 14 of commutators that are properly positioned on the track, and to assure proper disposition of the commutators on the track 27, deflectors 31 and 32 project into the bowl from its side wall above the track. The deflector 31 will dislodge commutators that tend to pile one upon the other, and the deflector 32 coacts with a downwardly sloping portion 33 which extends for a distance along the length of the track 27 ahead of the discharge port, to dislodge commutators not properly positioned on the track.

As seen in FIG. 26, properly positioned commutators ride along the track 27 with their tangs in the groove 30 and also between the side wall of the bowl and a guard rail 34. The rail 34 is removably supported from the side wall of the bowl by brackets 35; the removability of the guard rail 34 and the manner of its securement enabling the structure to be adjusted to handle commutators of different sizes.

At the discharge port 29, a gate, indicated generally by the numeral 35, functions to successively transfer individual commutators to the feed track or chute 21, and through control of the opening and closing of the gate the advance of the commutators is timed to assure that a commutator will arrive at the assembly station of the machine in time to be paired with an armature core that arrived at the assembly station by rolling down the track 15. The gate 35 consists of a lever 35 mounted to swing about a fixed pivot 37 and having a sector-shaped plate 38 detachably fixed thereto. A notch 39 in the outer arcuate edge 40 of the plate accommodates only a single commutator so that—assuming the presence of a commutator in the notch 39—rocking of the lever in the clockwise direction to its position shown in FIG. 28, results in the foremost of the row of commutators moving along the track 27 being transferred to the track or chute 21, while the next and succeeding commutators are held back by the curved edge 40 of the plate 38.

Rocking of the gate lever 36 in the opposite direction to its position shown in FIG. 27, enables the next commutator to enter the notch 39 and be held thereby until the gate is again opened. An air cylinder 41 opens and closes the gate by rocking the lever 36 from one position to the other.

The detachability of the sector-shaped plate 38 enables the gate 35 to be adapted to different sized commutators.

Successive presentation of the armature cores to the assembly station is controlled by a gate mechanism, indicated generally by the numeral 45 and shown particularly in FIGS. 5, 6 and 7.

The gate mechanism 45 comprises a lever 46 mounted to rock about a fixed horizontal pivot 47 at the lower end of a leg 48 which depends from a platform 49 that constitutes part of the fixed frame structure of the machine. Detachably secured to the lower end of the lever 46 is a plate 50 from which a pair of parallel horizontally disposed pins 51 and 52 project. As seen in FIG. 5a, the lever 46 and the plate 50 secured to its lower end, are located to one side of the inclined track 15, but the pins 51 and 52 project over the track and are so spaced with respect to the axis of the pivot 47 and the track 15 that one or the other of the pins, depending upon the position of the lever 46, will always block movement of armature cores along the track. It should, of course, be understood that the diameter of the armature cores must be taken into account, and for this purpose, the plate 50 is replaceable by virtue of its being detachably mounted on the lever 46.

A tension spring 53 connected between the lever 46 and the platform 49 yieldingly holds the lever—and hence the plate 50—in the position shown in FIG. 5, in which the pin 51 blocks further descent of the armature cores down the track.

Comparison of FIGS. 5 and 6 illustrates how rocking of the lever 46 in opposition to the force of the spring 53 releases the leading armature core for continued travel down the track 15 and, at the same time, restrains the succeeding armature cores from following the released core. Such rocking motion is imparted to the lever 46 by downward motion of a cam 54 which engages a cam follower 55 fixed to the upper end of the lever 46.

The cam 54 is actuated by the ram 56 of an air cylinder 57 which is mounted on and projects upwardly from the platform 49 substantially in line with the track 15. A block 58 fixed to the lower end of the ram has the cam 54 secured thereto and also has a pair of spaced apart yokes 59 and 60 depending therefrom.

As shown in FIG. 7a, these yokes are so positioned with respect to the axis of the ram and the track 15 that as the ram descends the yoke 59 moves across the outer face of one of the track rails 16, while the yoke 60 moves along a vertical path substantially equispaced between the rails. This of course entails constraining the ram against turning, which may be done in any suitable manner as by a guide rod 58' projecting up from the block 58, and slidably received in a hole through the platform 49.

The yoke 59 has a long leg 61 and a shorter leg 62, the latter being at the upstream side of the yoke—with respect to the track 15. Hence, as the yoke is lowered, its long leg first projects below the level of the track to stop an armature core rolling down the track, and then as the yoke continues to descend, the shorter leg 62 also projects below the level of the track whereupon the armature core shaft is embraced by the legs of the yoke. In this manner the armature core is positioned and held at the assembly station.

It should of course be understood that the functioning of the air cylinder 57 to cause the ram 56 to descend is so timed with the opening of the gate mechnism 45 that the long leg 61 will be in a position to stop the released armature core when it arrives at the assembly station.

By the time the ram has descended far enough to stop the approaching armature core (FIG. 6), the portion of the cam 54 then engaged by the cam follower 55, being vertical, will no longer impart motion to the lever 36. Hence, continued descent of the ram does not affect the condition of the gate mechanism 35 which remains in its condition shown in FIGS. 6 and 7 to hold back the armature cores on the track 15.

The yoke 60 is of a size and shape to straddle the stack of laminations of the armature core when the shaft thereof is embraced by the yoke 59, see FIGS. 7 and 7a. Not only does the straddling of the core by the yoke 60 properly locate the core, but it also makes it possible for the descent of the yoke to rotate the core to a predetermined position in which its winding slots occupy a specified angular relationship with respect to a fixed plane containing the axis of the armature core. FIGS. 8, 9 and 10 illustrate this feature of the invention. These figures view the illustrated structure from the side thereof opposite that seen in FIGS. 5–7.

As seen in FIGS. 8, 9 and 10, the legs of the yoke 60 have pawls 63 medially pivoted thereto as at 64. These pawls are yieldingly biased to positions in which beaks 65 on their lower extremities project into the space between the legs of the yoke 60 to enter the mouths of the winding receiving slots 8 in the armature core as the yoke 60 approaches the armature core at the assembly station. It is this engagement of the beaks 65 with the armature core during descent of the yoke 60 by which the core is rotated to its proper position.

To accommodate the pawls 63, the yoke 60 has pockets or recesses 66 in the face thereof remote from the yoke 59. These pockets or recesses are of a size to contain all but the beak portions 65 of the pawls. Compression springs 67 confined between the inner side walls 68 of the recesses and the upper end portions of the pawls yieldingly hold the pawls in their operative positions defined by adjustable stops 69.

The stops 69 are so adjusted that the distance between the beaks 65 of the pawls is sufficiently less than the diameter of the armature core that as the beaks approach the core, at least one of them will contact the upwardly facing edge of one of the winding slot mouths as seen in FIG. 9. During completion of the descent of the yoke 60, the thus engaged pawl beak imparts torque to the armature core and rotates it sufficiently to enable the other pawl beak to engage the upwardly facing edge of a winding slot at the opposite side of the core, whereupon the two pawls coact during the final stage of their descent to positively bring the core into its desired rotational orientation, and hold the same against accidental displacement therefrom as long as the ram 56 remains in its lowered position.

A spring pressed plunger 70 mounted in the bight portion of the yoke 60, engages the top of an armature core being held at the assembly station jointly by the yoke 59 and the pawls 63, to assure against having the core lifted off the track 15 by the ascent of the pawls as the ram 56 rises.

Attention is directed to the fact that one of the legs of the yoke 60, specifically the one farthest down the inclined track 15, has a magnetic detector 71 mounted thereon to detect the presence or absence of a core at the assembly station. Response of this detector to the presence of a core initiates the functioning of the gate 35 by which the feeding of commutators to the assembly station is controlled. Hence, unless an armature core is in position at the assembly station, no commutator will be released. The circuitry through which the magnetic detector performs its function has not been illustrated since it constitutes no part of the invention, and moreover would be well within the skill of any electrical engineer. For the same reason, no attempt has been made to illustrate the various limit switches and their circuits by which the sequence of events in the operation of the machine are initiated and controlled.

As perhaps best seen in FIG. 14, the vertical guideway 22 by which the commutators are directed onto the basket-like support 23, is formed by a pair of rails 75 each generally U-shaped in cross-section. These rails are detachably secured to one face of an upright wall 76 with their open sides facing one another. The basket-like support 23 is also detachably secured to the wall 76, but indirectly so, since it is actually affixed to a die member 77 which in turn is mounted in the wall 76.

The die member 77 is a barrel with a hole or bore 78 axially therethrough, see FIG. 22. It is inserted into a round hole 79 in the wall 76 and held thereby a set screw 80. The hole or bore 78 through the die member is of a diameter to slidably accept the commutators, and to accommodate the tangs on the commutators the boundary surface of the hole has circumferentially equispaced parallel grooves 82 of a size just large enough to permit the tangs to slide therethrough.

The axial length of the die member is equal to the thickness of the wall 76 so that the ends of the die member are flush with the opposite faces of the wall, and the basket like support 23 is detachably secured to that end of the die member which is flush with the face of the wall to which the vertical rails 75 are secured. Accordingly, the support 23 is positioned across the bottom of the vertical guideway 21.

The support 23 is shaped to provide a pair of parallel horizontal rails 83 with transversely curved top surfaces, the curvature of which coincides with the boundary surface of the hole 78 in the die member. Hence, a commutator dropped onto the basket-like support 23 will be coaxially aligned with the die member. To accommodate the tangs of a commutator seated on the rails 83, the end portions of the rails adjacent to the die member are cut away as at 84 (FIGS. 14 and 22). This relief permits the commutator to be rotated.

The wall 76 in which the die member is fixed and by which the support 23 and the vertical guideway 21 leading thereto are carried, is mounted on a carriage 85 which in turn is slidably mounted between guides 86 on the base 17 that forms part of the frame structure of the machine (see FIG. 17). It is important to observe that the guides 86 constrain the carriage 85 to reciprocation along a path parallel to the axis of an armature core at the assembly station, and that a commutator seated on the basket-like support 23 is coaxial with the armature core. Hence, since the support 23 holds the commutator axially aligned with the die member, displacement of a commutator off of the support 23 and through the die member results in assembly of the commutator onto the armature core, provided the carriage 85 has been moved far enough towards the armature core.

However, before a commutator on the support 23 is displaced therefrom, it must be properly angularly oriented with respect to the armature core onto which it is to be assembled—that is, rotated to a predetermined position. The mechanism by which such rotation is imparted to the commutator comprises a finger 87 pivotally mounted on the support 23 by a stud 88 screwed into a tapped hole in the lower portion of the support. The upper free end of this pivoted finger has a pin 89 projecting laterally therefrom and located between the end portions of the rails 83 which are cut away to accommodate the tangs on the commutators. Hence the pin 89 is in position to be received between the lowermost pair of adjacent tangs of a commutator dropped onto the support 23. Rocking the finger about its pivotal mounting thus will rotate the commutator through a limited angle.

The finger 87 is moved to a "cocked" position shown in FIG. 12 by an air cylinder 90 which is secured to the support 23 and projects horizontally from one side thereof. The ram 91 of this cylinder passes through the interbeing portion of the support and is connected to the finger as at 92.

Suitable biasing means not shown, yieldingly urges the finger 87 toward a defined limit of motion shown in FIGS. 11 and 13, so that regardless of the position of rotation the commutator might be in when it drops onto the support 23, the release of the finger 87 by relief of pressure in the cylinder 90 results in the commutator being rotated to a definite position with each tang thereof in its proper angular relationship with its associated winding receiving slots of the armature core, which in this instance is exact angular alignment.

When the commutator has been thus rotationally oriented, it is shoved off the support 23 and into the die member, and to permit such displacement of the commutator, the flanges 93 of the vertical rails 75 that lie flat against the wall 76 are cut away, as at 94; in fact, the opposite flanges 93' are likewise cut away, as at 94', but for another reason.

As noted hereinbefore, guides 86 constrain the carriage to reciprocation along a path parallel to the axis of an armature core at the assembly station. A second carriage 97 is also movable along the guides 86, the two carriages being connected to move in unison as well as with respect to one another. The connection between the carriages comprises a rod 98 projecting from a boss 99 on the carriage 85 and passing slidably through a hole in a boss 100 on the carriage 97, and a compression spring 101 on the rod 98 confined betweeen the bosses 99 and 100. The spring yieldingly holds the two carriages spaced apart a distance determined by the adjustment of a pair of nuts 102 threaded on the rod and engaging the boss 100.

Motion is imparted to the connected carriages by an air cylinder 104 mounted under the base 17 with its ram 105 positively connected to the carriage 97 through an arm 106 depending from the underside of the carriage. The stroke of the ram and hence the travel of the carriage 97 is defined by a fixed stop 107 with which the arm 106 collides and an adjustable stop nut 108 on the ram and engageable with an abutment 104' which is fixed with respect to the cylinder. During projection of the ram 105, i.e. during its motion towards the left in FIGS. 17, 18 and 19, the collision of the arm 106 with the fixed stop 107 limits travel of both carriages. However, in the opposite direction, motion of the carriage 85 is stopped before the retraction of the ram is arrested, travel of the carriage 85 in this direction being limited by the collision of an adjustable stop 109 on the carriage with a fixed stop 110 on the base 17.

The carriage 97 has mounted thereon the mechanism for pressing the commutators onto the armature core shafts and also the structural elements by which the tangs are shaped. This structure, which is best shown in FIGS. 17 through 20, comprises a cylinder block 114 mounted on the carriage 97 and having a bore 115 coaxilly aligned with the die member 77 and an armature core at the assembly station. Fixed to the cylinder block and projecting coaxially from its bore towards the wall 76 is a pusher bar 116. During operation of the machine this bar shoves a commutator off the support 23 and onto the shaft of the armature core.

Encircling the bar 116 and slidable in the bore 115 is a piston member 120 with a tubular extension 121 projecting from the cylinder in telescoping relation with the pusher bar 116. A tang-shaping sleeve 125 encircling the pusher bar, extends into the tubular extension 121 and is detachably secured thereto by a split clamping ring 126, the end of the tubular extension on which the clamping ring is mounted having slits 127 to facilitate the clamping action, see FIG. 21.

Relative axial motion between the pusher bar 116 and the piston member 120 is limited by the engagement of the inner unthreaded end of a screw 130 screwed into the sleeve 125, with the opposite ends of a longitudinally extending slot 131 in the pusher bar. Since the commutator must be pushed a substantial distance beyond the end of the armature shaft during its assembly with the armature core, the outer end of the pusher bar 116 is hollow to telescope over the armature shaft.

Obviously, of course, as the commutator is pushed onto the armature shaft, the armature core must be supported against axial displacement. This can be done in different ways, but is conveniently accomplished by mounting a stop 135 on the base 17 in position to be engaged by the adjacent end of the shaft of an armature core at the assembly station. This stop should be adjustable to accommodate armature shafts of different lengths, and as shown in FIGS. 3 and 4 can be simply an enlarged head on a screw 136 threaded into a block 137 projecting up from the base 17. In FIGS. 17, 18 and 19, the stop 135 is diagrammatically portrayed.

An important feature of the machine is its provision for straightening the commutator tangs during the assembly of the commutator onto the armature core. This is accomplished by the transfer of the commutator from the basket-like support 23 into the die member 77. It will be recalled that the bore 78 through the die member is of a size to slidably accept the commutator, and that its grooves 82 are of a size to permit the tangs to slide therealong, but for this to occur all of the tangs must be correctly aligned with the axis of the commutator—that is, they must be symmetrical to radial planes containing the axis of the commutator and bisecting the fixed ends of the tangs. It follows, therefore, that any tang which is askew or displaced to one side or the other of its proper position, will be brought into proper position—will be straightened—as the commutator is pushed into the die member by the advance of the pusher bar 116.

To facilitate entry of the commutators into the bore of the die member, the ends of the lands between its grooves are bevelled, as at 138, and to facilitate entry of the tangs into the grooves, the mouths of the grooves are flared, as at 139, see FIG. 22.

The displacement of the commutators off of the support 23 and into the die member requires movement of the carriage 97 towards the carriage 85 and hence does not occur until the advance of the latter carriage is stopped by collision of its stop 109 with the stop 110. By the time these stops engage, the die member will have embraced the shaft of the armature core and will be in the position shown in FIGS. 18 and 19. Continued advance of the carriage 97 with respect to the now stationary carriage 85 compresses the spring 101 and thus firmly holds the carriage 85 in its advanced position. It also causes the pusher bar 116 to engage the commutator on the support 23 and push it therefrom into the die member and onto the armature shaft. The advance of the pusher bar is stopped by the collision of the adjustable stop 108 on the ram with its cooperating fixed stop 104' which positively limits the motion of the ram and accurately locates the commutator on the armature shaft. By adjustment of the stop 108 the commutator can be brought to its desired position on the armature shaft, as for instance just contacting the end of the adjacent insulating sleeve 9.

It should be noted that when the commutator reaches its selected position on the armature shaft, the commutator is still in the die member with its tangs in the discharge ends of the grooves 82. The cylinder 115 is now pressurized to move the piston 120 and advance the tang shaping sleeve 125. As best seen in FIGS. 16 and 21, this sleeve has circumferentially equispaced fingers 140 which telescope over a commutator in the die member and move endwise along the grooves 82, it being understood that there is one such finger for each groove and that the fingers are aligned with the grooves. To permit the fingers 140 to telescope over a commutator in the bottom of the guideway 21 and enter the grooves in the die member, is the reason for cutting away part of the flanges 93' as at 94'. The extremities of the fingers 140 are wedge or chisel shaped with the edges thereof at the radially inner surface of the fingers. The ends of the fingers thus present radially outwardly and rearwardly sloping cam surfaces 146 which engage under the tangs and lift those thereof that are not sufficiently spaced from the underlying cylindrical surface of the commutator, as the sleeve arrives at its foremost limit of motion. Though it is not mandatory that the fingers 140 lift all of the tangs to exactly the same height, this can be assured and all of the tangs can be given the same hook shaped formation by so dimensioning the fingers that they lift the tangs engaged thereby against the bottoms of the grooves.

In the event one or more of the tangs is so deformed that its free end is tight against the underlying cylindrical surface of the commutator so that the edge of the approaching finger 140 can not engage under the tang to lift it, advance of the sleeve 125 is arrested. This interruption in the advance of the sleeve 125 is used to initiate the functioning of reject mechanism by which imperfect commutator-armature core assemblies are shunted from the path taken by the "good" assemblies leaving the machine.

The reject mechanism can take any desired form. Thus, as shown in FIG. 3, it may consist of a "trap door" 147 in the discharge portion of the track 15 down which the commutator-armature core assemblies roll from the assembly station. Opening of the trap door permits an approaching unit to drop into a reject bin, not shown. Such opening of the trap door may be effected by any suitable mechanism (not shown) in response to detection by one of the fingers 140 of a defectively shaped tang.

The machine is equipped with many refinements which, though of lesser importance than the features described, contribute to its completeness. For instance, to assure against premature displacement of a commutator off of the support 23, an air blast is projected into the lower end of the guideway 21 and against a commutator therein. For this purpose, the die member has one or more air discharge ports 150 leading from an annular groove 151 in its periphery to the bore 78 of the die member, with the mouths of the discharge ports facing towards the guideway 21. The groove 151 registers with a port 152 in the wall 76 (FIG. 14) with which an air supply line connects, and O-rings 153 flanking the groove 151 guard against passage of air from the groove except through the ports 150.

Another detail resides in the provision of means for checking whether or not the armature cores approaching the assembly station are in proper endwise orientation. For this purpose, a pair of rod-like stops 155 embraces the track 15. These stops are so spaced and positioned with respect to the track that properly oriented armature cores roll down the track without contacting them, while improperly endwise oriented armature cores collide with one or the other of the stops. This arrests advance of the improperly oriented armature core with the result that the machine stops due to the absence of a core at the assembly station.

The machine is also stopped when a photo cell 160 mounted on the vertical guideway 21 senses the absence of a commutator on the support 23 when one should be there.

Since the machine is intended to handle armature cores and commutators of different sizes and styles, all portions of the machine which have some contact with either the armature core or the commutator, and which thus may be considered "tooling" are either detachably mounted to permit replacement thereof with different sized counterparts, or are adjustable. For the most part, this interchangeability and adjustment has been recognized in the foregoing description, and where not specifically mentioned is to be understood.

OPERATION

Although the operation of the machine is believed to be clear from the foregoing description, a brief summary thereof along with the flow sheet—FIG. 29—may be helpful.

Starting with the premise that the vibratory bowl 20 contains a supply of commutators and that a row of armature cores is on the upper end portion of the track 15 which may be considered an inventory track, actuation of the appropriate controls on the control panel 170 of the machine initiates its operation. The cycle begins with descent of the ram 56 of the top cylinder 57. This actuates the gate mechanism 45 to release the foremost or leading armature core on the inventory track for advance to the assembly station, and at the same time restrains the next and succeeding armature cores on the inventory track from further advance.

The descent of the ram 56 also brings the yokes 59 and 60 into their operative positions to stop the advancing armature core and hold it at the assembly station. During final descent of the ram 56, the beaks 65 of the pawls 63 that are carried by the yoke 60 engage the armature core and rotate it to a definite position.

The presence of an armature core at the assembly station is sensed by the magnetic detector 71 and as a result the gate 35 functions to transfer or kick the leading commutator in the row thereof leaving the vibratory bowl, onto the inclined track or chute 21, while holding back the next and succeeding commutators. Response of the magnetic detector 71 also causes the air cylinder 90 to "cock" the commutator rotating finger 87.

The commutator rolling down the inclined track or chute 21 drops down the vertical guideway 22 onto the basket-like support 23. As it does, the electric eye 160 senses the presence of a commutator at the assembly station and, acting through appropriate circuitry, relieves pressure in the air cylinder 90 to allow the bias on the finger 87 to swing the same to a defined position and in so doing rotationally orients the commutator into proper relation with the armature core at the assembly station.

The response of the electric eye also initiates the operation of the main press cylinder 105 to effect retraction of its ram 105. During part of the retraction of the ram the commutator support 23 with a commutator thereon, and the die member 77 move with it towards the armature core; but before the retraction stroke of the ram is complete the advance of the commutator support and die member is arrested. The continued advance of the ram, acting through a pusher bar 116, shoves the commutator off the support 23 and into the die member. As it does, any tangs of the commutator that are not properly positioned with reference to radial planes containing the commutator axis and bisecting the fixed ends of the tangs, are straightened by the entry of the tangs into the grooves 82 in the bore of the die member. The advance of the pusher bar 116 also presses the commutator onto the shaft of the armature core.

Upon completion of the retraction of the ram 105 the cylinder 115 is pressurized to project the tang checking and shaping fingers 140 over the commutator and into the grooves 82 in the die member. As the fingers 140 move into the grooves, their chisel or wedge-shaped extremities contact and lift the tangs, preferably against the bottom of the grooves, and thus properly shape all of the tangs.

Completion of the advance of the fingered tang checker and shaper acting through limit switch controlled circuitry causes the main press cylinder to move the ram 105 in the opposite direction, i.e. to project it from the cylinder. This restores the commutator support and the die member and all associated parts to their original positions ready to receive and act upon the next commutator, and competion of this stroke of the ram effects elevation of the ram 56 of the vertical top cylinder 57 to release the assembled commutator and armature core for delivery, and also conditions the machine for its next cycle.

In the event any one of the commutator tangs is so deformed that it cannot be lifted by its respective shaping finger 140, the resulting interference with the advance of the fingered tang checker and shaper, acting through appropriate circuitry actuates reject mechanism, depicted by the "trap door" 147 in the delivery track, to keep imperfect commutator-armature core assemblies from being delivered along with the satisfactory units.

From the foregoing description taken with the accompanying drawings, it should be apparent to those skilled in the art, that this invention will significantly reduce the cost of assembling commutators onto armature cores.

Those skilled in the art will appreciate that the invention can be embodied in forms other than as herein disclosed for purposes of illustration.

The invention is defined by the following claims.

We claim:

1. A device for straightening and shaping the terminal tangs of a commutator, comprising:
   (A) a die member having a hole of a size and shape to axially slidably accept the commutator, the boundary surface of the hole having circumferentially equispaced longitudinally extending parallel grooves of a size to accommodate the tangs;
   (B) mounting means for the die member;
   (C) positioning means fixed with respect to said mounting means to receive and displaceably hold a commutator coaxially in front of the hole in the die member; and
   (D) pusher means movable with respect to said mounting means and the die member to push a commutator from said positioning means into the hole in the die member with the tangs sliding along said grooves to be thereby brought into predetermined positions relative to the axis of the commutator.

2. The device of claim 1, further characterized by:
(A) a sleeve having circumferentially equispaced longitudinally extending fingers, equal in number to the number of grooves in the die member, and so disposed with respect to the axis of the die member as to telescopically embrace a commutator in the die member with each finger slidably received in one of the grooves upon relative axial movement in one direction between the sleeve and the die member; and
(B) means at the extremities of said fingers to engage under the tangs of a commutator in the die member and lift the free ends of the tangs towards the bottoms of the grooves.

3. The device of claim 2, further characterized by:
(A) a mounting member for said sleeve;
(B) means for detachably securing the sleeve to its mounting member; and
(C) means for detachably securing the die member to its mounting member, so that the die member and sleeve can be removed and replaced by another die member and sleeve to accommodate a different sized commutator.

4. In a machine for automatically assembling commutators with armature cores of the type comprising a shaft with a stack of laminations thereon, the stack of laminations having circumferentially spaced winding receiving slots opening to its periphery and the commutators having circumferentially spaced terminal tangs at one end thereof,
mechanism for holding an armature core in a predetermined position with its winding receiving slots in defined rotational orientation, preparatory to having a commutator pressed onto the shaft of the armature core, said mechanism comprising:
(A) a support upon which the shaft of the armature core rests;
(B) yoke means having spaced legs;
(C) means mounting the yoke means above the support for up and down motion with its legs projecting downwardly to embrace an armature core on the support in the lowered position of the yoke means, so that the yoke means and the support coact to restrain the armature core against movement other than rotation;
(D) power means for imparting up and down motion to the yoke means; and
(E) rotation imparting means movable with the yoke means to engage the stack of laminations of the armature core during descent of the yoke means and rotate the armature core to a defined position.

5. The structure of claim 4, wherein said support is in an inclined track so that armature cores having their shafts resting thereon will roll down the track when not restrained,
and wherein the yoke means has a pair of legs arranged to embrace the shaft of an armature core,
and wherein the legs of said pair are of unequal length, the longer of said legs being farthest down the inclined track so that during descent of the yoke means said longer leg projects below the level of the adjacent portion of the track to stop an approaching armature core before its shorter companion leg projects below the level of the track.

6. The structure of claim 5, further characterized by: gate means in juxtaposition to the inclined track upwardly along the track from the location of the yoke means to control the passage of armature cores down the track towards the yoke means and operable to release one armature core at a time for advance to a position under the yoke means, and control means for the gate governed by the motion of the yoke means so that the release of an armature core by the gate means is so timed that the longer one of said pair of legs is in position to stop the advancing armature core by the time it arrives at said position.

7. The structure of claim 6, wherein the gate means comprises a medially pivoted lever rockable between defined positions about a fixed horizontal axis above the track,
and a pair of spaced abutments on the lower portion of the lever movable towards and from the track as the lever rocks,
said abutments being so disposed with respect to the pivot axis of the lever that only one abutment is close enough to the track to block passage of an armature core in each position of the lever.

8. The structure of claim 7, wherein the gate means further comprises
means biasing the lever to its defined position at which the abutment farthest down the inclined track is in operative blocking position,
and wherein said control means comprises a cam movable with the yoke means and a cam follower on the upper portion of the lever riding on the cam,
descent of the cam with the yoke means rocking the lever to its opposite position to thereby effect release of the foremost armature core on the track and restraint of succeeding armature cores.

9. The structure of claim 4, wherein said rotation imparting means comprises
a pawl carrier fixed with respect to the yoke means and movable towards and from the upwardly facing side of the stack of laminations of an armature core held by the yoke means,
and a pair of opposing pawls pivotally mounted on said pawl carrier with their free ends spaced apart along a line transverse to the axis of an armature core being held by the yoke means, with the distance between the free ends of the pawls less than the diameter of the stack of laminations of the armature core to engage in the mouths of circumferentially spaced winding slots and impart rotation to the armature core during descent of the yoke means.

10. The structure of claim 9, wherein the pawl carrier comprises a pair of legs which form part of the yoke means and are spaced apart a distance to receive therebetween the stack of laminations of the armature core, and wherein the pawls have beaks on their free ends to project into the space between said pair of legs, and biasing means yieldingly urging the pawls to positions at which their beaks project into the space between said legs.

11. In a machine for automatically assembling commutators with armature cores of the type comprising a shaft with a stack of laminations thereon, the stack of laminations having circumferentially spaced winding receiving slots opening to its periphery and the commutators having circumferentially spaced terminal tangs at one end thereof which must be in predetermined positional relationship with respect to the winding receiving slots of the armature core,
mechanism for holding a commutator with its terminal tangs in predetermined rotational orientation preparatory to being pressed onto the shaft of an armature core, said mechanism comprising:
(A) an upright guideway having a bottom to rotatably support a commutator with its axis horizontal;

(B) a finger pivotally mounted to swing about an axis fixed with respect to said bottom, with the free end of the finger in position to have a portion thereof engage between a pair of adjacent terminal tangs on the commutator; and
(C) means for rocking the finger to a defined position to thereby rotate the commutator to a predetermined position.

12. In a machine for automatically assembling commutators with armature cores of the type comprising a shaft with a stack of laminations thereon, the stack of laminations having circumferentially spaced winding receiving slots opening to its periphery and the commutators having circumferentially spaced terminal tangs at one end thereof, which must be in predetermined positional relationship with respect to the winding receiving slots of the armature core, mechanism for holding a commutator with its terminal tangs in predetermined rotational orientation preparatory to being pressed onto the shaft of an armature core, said mechanism comprising:
(A) a basket-like support to receive and rotatably hold a commutator with its axis horizontal;
(B) a pivoted finger mounted to rock about a horizontal axis below the basket-like support, with the free end of the lever projecting upwardly to have a part thereof engage between the lowermost pair of adjacent terminal tangs, so that rocking of the finger imparts rotation to the commutator; and
(C) means for rocking the finger to a defined position to thereby rotate the commutator to a predetermined position.

13. The structure of claim 12, further characterized by an upright guideway above the basket-like support to receive and guide commutators onto the support with its terminal tangs positioned to have the lowermost thereof straddle said part of the free end of the finger.

References Cited
UNITED STATES PATENTS 1,690,322   11/1928   Baker _____ 29—205 CM THOMAS H. EAGER, Primary Examiner U.S. Cl. X.R.

29—205 D